United States Patent [19]

Crack

[11] Patent Number: 4,889,005
[45] Date of Patent: Dec. 26, 1989

[54] REMOTE CONTROL MECHANISMS

[75] Inventor: David J. Crack, Chelmsford, England

[73] Assignee: Morse Controls Limited, Basildon, England

[21] Appl. No.: 172,276

[22] Filed: Mar. 23, 1988

[30] Foreign Application Priority Data

Apr. 6, 1987 [GB] United Kingdom ............... 8708166

[51] Int. Cl.[4] .............................................. F16C 1/12
[52] U.S. Cl. .................. 74/501.6; 74/502.4; 74/502.6; 74/512; 74/560
[58] Field of Search ............. 74/512, 513, 560, 500.5, 74/501.6, 502.4, 502.6; 248/56; 16/2; 403/197, 71, 353, 122, 199

[56] References Cited

U.S. PATENT DOCUMENTS

| 1,487,266 | 3/1924 | Regan | 74/502.6 |
|---|---|---|---|
| 1,628,858 | 5/1927 | Shawk | 16/2 X |
| 2,009,206 | 7/1935 | Rosner | 74/502.6 X |
| 2,845,812 | 8/1958 | Pobar | 16/2 X |
| 3,319,912 | 5/1967 | Crowther | 74/502.4 |
| 3,366,356 | 1/1968 | Fisher | 16/2 X |
| 3,645,150 | 2/1972 | Crossland | 74/502.4 |
| 3,730,318 | 5/1973 | Camp | 74/502.4 X |
| 3,752,008 | 8/1973 | Danek | 74/502.4 |
| 4,064,767 | 12/1977 | Boersma | 74/512 X |
| 4,185,515 | 1/1980 | Webb | |
| 4,266,439 | 5/1981 | Hayashi et al. | 74/502.4 |
| 4,351,198 | 9/1982 | Hansen | |
| 4,364,284 | 12/1982 | Tani et al. | 74/502.6 X |
| 4,546,666 | 10/1985 | Secord | 74/502.4 |
| 4,682,513 | 7/1987 | Reeder | 74/502.4 X |
| 4,738,155 | 4/1988 | Stocker | 403/197 X |

FOREIGN PATENT DOCUMENTS

| 0044699 | 1/1982 | European Pat. Off. | |
| 86717 | 8/1983 | European Pat. Off. | 74/502.4 |
| 0183341 | 6/1986 | European Pat. Off. | |
| 688182 | 8/1930 | France | 74/560 |
| 1111742 | 4/1956 | France | 16/2 |
| 1549675 | 12/1968 | France | |
| 2360785 | 3/1978 | France | 74/502.4 |
| 1235447 | 6/1971 | United Kingdom | |
| 1259115 | 1/1972 | United Kingdom | |
| 2052000 | 1/1981 | United Kingdom | |
| 2177771 | 1/1987 | United Kingdom | |

Primary Examiner—Rodney M. Lindsey
Attorney, Agent, or Firm—James Creighton Wray

[57] ABSTRACT

A foot pedal controller 1 comprises a pedal 2 to which is attached a lever 3 pivotally mounted both in a mounting flange 4 and an anchor plate 10. Downward force applied to the pedal 2 causing pivotal motion of the lever 3 in an operational sense is resisted by a tension spring 14 connected between the anchor plate 10 and the lever. A flexible cable 18 comprises a core 19 translatable within a casing 20. The core 19 is operatively attached to the lever 3 by a retaining clip 26 which is snap fitted to the lever 3. The casing 20 is secured against translational movement to the anchor plate 10 by a plug-in cable hub 38 having a flange 40 abutting one side of the anchor plate and a pair of spring arms 45 which will deform radially inwardly when the cable hub is pushed into a receiving aperture 47 in the anchor plate and then spring radially outwardly to abut the other side of the anchor plate. The core 19 can be operated by the foot pedal 2 alone by having a lug 22 with an enlarged head 22 engaging in a countersink 32 in the retaining clip 26. Alternatively, a hand control can be fitted as well in which event the core 19 would be extended through the retaining clip 26 and a second casing would encase the core to a hand control member and have one end seat in that countersunk 32, by which either the foot pedal 2 or the hand control member can be selectively used to translate the core in a pull mode.

19 Claims, 2 Drawing Sheets

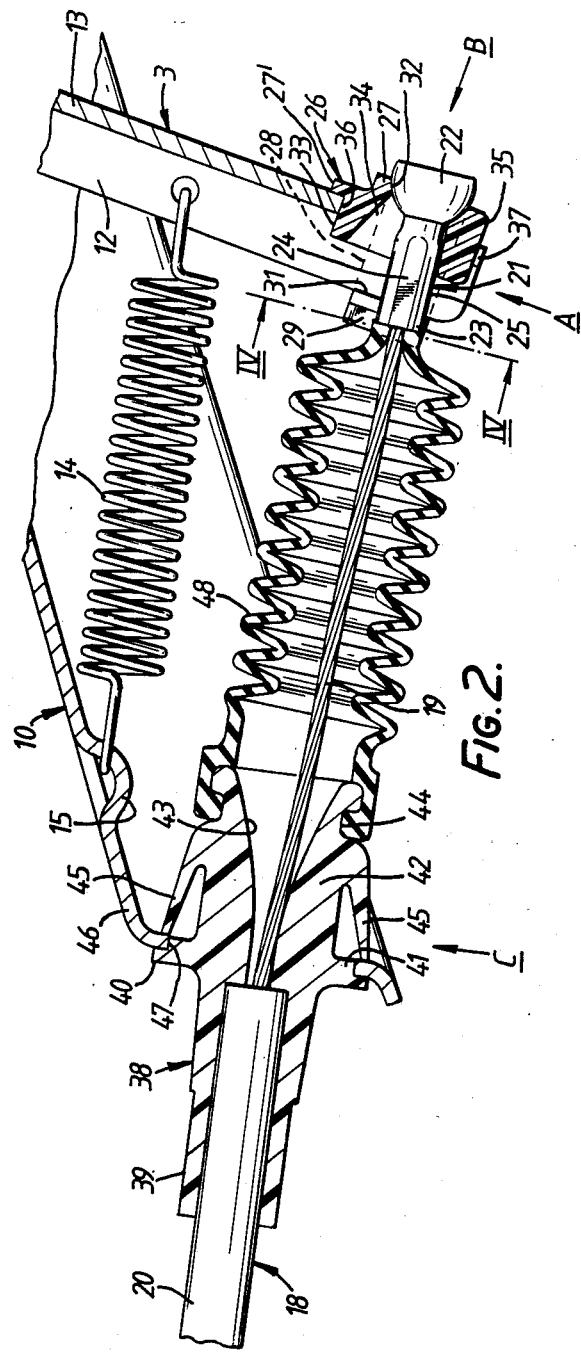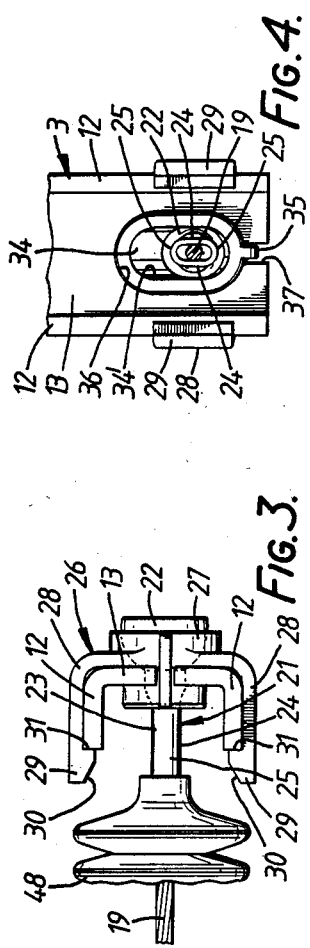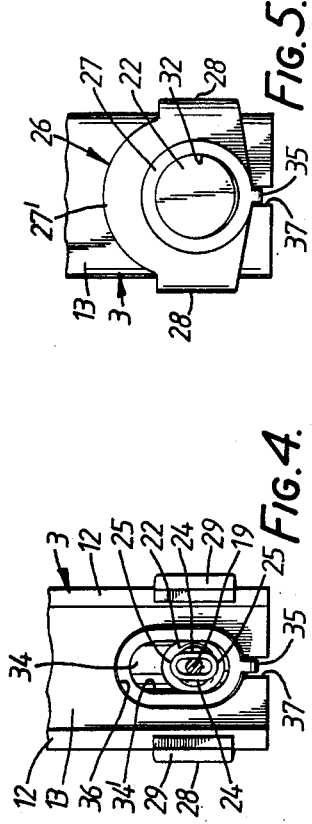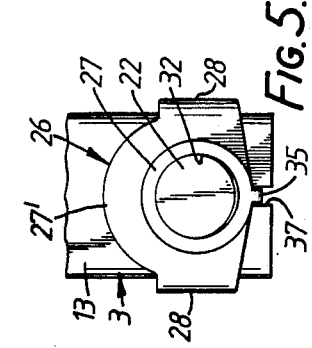

REMOTE CONTROL MECHANISMS

This invention relates to remote control mechanisms.

Remote control mechanisms utilizing a flexible cable for transmitting motion between operator and operated stations are well known. With such a mechanism, the cable core is attached to movable operator and operated members so as to transmit motion from the one to the other, and the cable casing within which the core translates is restrained against movement. Conventionally, the cable core is attached as by threaded means to the operator and/or operated member, and the casing is clamped against movement. Such an arrangement requires the provision of loose piece parts and the need for special tools apart from the act of assembly being relatively time consuming.

According to the invention there is provided a remote control mechanism comprising a stationary member, a movable member, a cable having a core translatable within a casing, first resiliently deformable means for engaging the cable casing with respect to the stationary member, and second resiliently deformable means for interconnecting the cable core to the movable member.

By means of the invention, the attachment of the cable core to a movable operator or operated member, as the case may be, and the restraining of the cable casing against movement at the operator or operated end of the remote control mechanism, can be carried out quickly and easily and without the need for any tools.

An embodiment of the invention which is at present preferred provides for attaching one end of the cable core to a movable operator member by a resiliently deformable clip and for restraining the cable casing against movement, when the core is translated, by a cable hub engaged by resiliently deformable arms to a stationary member.

In order that the invention may be well understood the preferred embodiment thereof, given by way of example, will now be described with reference to the accompanying drawings, in which:

FIG. 2 is a partial sectional side elevation, to a larger scale, of the same mechanism;

FIG. 3 is a scrap underplan view in the direction of arrow A of FIG. 2;

FIG. 4 is a section along line IV—IV of FIG. 2;

FIG. 5 is a scrap end elevation in the direction of arrow B of FIG. 2;

Figure 1:
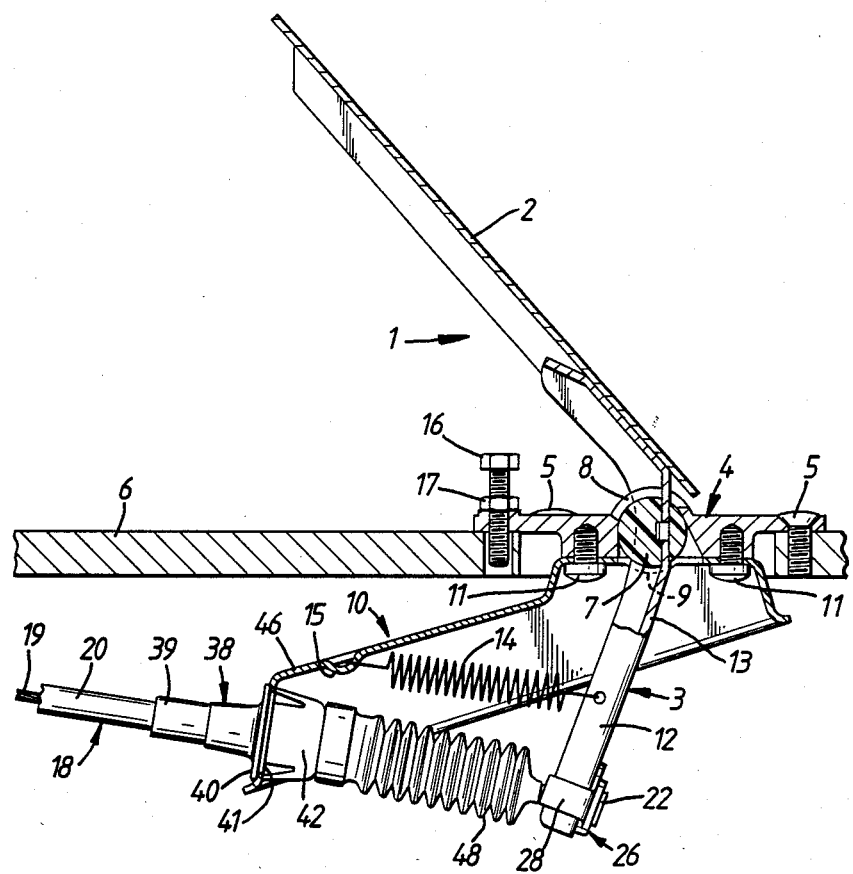
FIG. 1 is a side elevation of the operator end of a remote control mechanism comprising a foot pedal controller shown sectioned and assembled to a control cable.

Referring first to FIG. 1, a foot pedal controller 1 comprises a pedal 2 to which is affixed in any suitable fashion a downwardly extending lever 3. The lever 3 is journalled for pivotal movement in a mounting flange 4 which is fixed by screws 5 upon a support structure 6. Any suitable bearing means 7 may be utilized to journal the lever 3 for its pivotal movement, that shown comprising a pair of half cylindrical bearing members of a plastics material through which the lever 3 extends and which are rotatably mounted between an upper curved bearing region 8 of the mounting flange 4 and a downwardly curved bearing region 9 of an anchor plate 10 which is fastened as by screws 11 to the underside of the mounting flange thereby to be positioned below the support structure 6.

The lever 3 is U-shaped in cross-section with flanges 12 extending from opposite ends of its web 13. Pivotal motion of the lever 3 in an anti-clockwise direction as viewed in FIG. 1 caused by downward force being applied to the pedal 2 is resisted by a tension spring 14. The opposite ends of the spring 14 are anchored respectively to an inward lug 15 on the anchor plate 10 and one of the flanges 12 of the lever 3. The downward limit of travel of the pedal 2 is set by an adjustable stop taking the form of a bolt 16 which is screwed into the mounting flange 4 and fixed in its adjusted position by a lock nut 17.

A flexible cable 18 is fitted to the foot pedal controller 1 to transmit pivotal motion of the lever 3 to a controlled member (not shown) which may take any of a number of different forms and serve any of a number of different functions. The present invention is particularly concerned with such fitment, ensuring same in a simple yet positive manner and without the need for any special tools.

Referring now more particularly to FIGS. 2 to 5, the cable 18 has a translatable core 19 slidable within a casing 20. The core 19 is operatively attached to the lever 3, and the casing 20 is restrained against motion relative to the anchor plate 10 which, as said, is fixed via the mounting flange 4 to the support structure 6. The attachment of the core 19 to the lever 3 will first be described and, thereafter, the securement of the casing 20 to the anchor plate 10.

The end of the core 19 is affixed to a lug 21 having an enlarged part-spherical head 22 from which extends an axial spigot 23 with diametrical opposite flats 24 formed by curved ends 25, i.e. of generally rectangular form. A retaining clip 26 of a resilient material, preferably a plastics material, is mounted about the lug 21 and is resiliently clipped to the lever 3 by which to attach the cable core 19 to the lever.

The retaining clip 26 has a central boss 27 from which radially extend a pair of arms 28 which are turned in an axial direction away from the head 22 of the lug 21. The inward end of each arm is fashioned with a nib 29 turned towards the spigot 23 of the lug. Each nib 29 has an angled end 30 and a flat inward radial shoulder 31. Each arm 28 is arranged to fit around the web 13 of the lever 3 and the respective lever flange 12 with the nib shoulder 31 abutting the end edge of the flange. The arms 28 are radially deformable so that they may first be sprung outwardly when the clip 26 is pushed on to the lever web 13, the angled end 30 assisting the passage of the clip, and will then snap inwardly to engage the nibs 29 behind the associated flange end edge thereby to firmly retain the retaining clip 26 to the lever 3.

The clip boss 27 is countersunk at 32 and also includes a rearward boss 33 which is apertured at 34. The core lug head 22 is arranged to seat in the countersunk region 32 with its spigot 23 extending through the boss aperture 34. The aperture 34 is configured similarly, although of larger dimensions, to the cross-section of the spigot 23. Moreover, the external configuration of the rearward boss 33 is similarly fashioned, so as to present an external hollow wall 34' which is generally rectangular with rounded ends. An axial guide lug 35 is moulded upon the retaining clip 26 at its lower region to extend the axial length thereof across the central boss 27, between the lower end of the arms 28 and across the rounded lower end of the rearward boss 33.

The lower end of the lever 3 has its web 13 formed with a positioning aperture 36 extending lengthwise of the lever and configured complementary to the periphery of the hollow wall 34' of the retaining clip 26. Moreover, the lever web 13 has a slot 37 extending from its positioning aperture 36 to its lowermost end to accommodate the axial guide lug 35 on the retaining clip 26.

To detachably attach the cable core 19 to the lever 3, the core is first passed through a rearward region of the anchor plate 10 as will be described and then through the slot 37 and the positioning aperture 36 in the lever web 13, with the retaining clip 26 and the core lug 21 positioned forwardly of the lever. With the core lug 21 pushed home in the retaining clip 26 so that its head 22 seats in the countersunk region 32, with the generally rectangular wall 34 and the guide lug 35 of the retaining clip 26 aligned with the positioning aperture 36 and slot 37, respectively, in the lever web 13, and with the angled ends 30 of the nibs 29 of the clip arms 28 resting against the lever web, a manual axially inward force applied to the core lug head 22 will cause, as previously described, the resilient arms 28 to spring outwardly and snap over the respective lever flanges 12 so that the nibs 29 will position behind the flange end edges with their flat radial shoulders 31 engaging those edges.

When so assembled, the clip wall 34' and its guide lug 35 will engage in the positioning aperture 36 and the slot 37, respectively, in the lever web 13, thereby locating and preventing the retaining clip 26 from being slid downwardly off the end of the lever 3.

The provision of the guide lug 35 on the retaining clip 26 also enables the clip to be properly aligned with the lever 3 so that when pushed on to the lever, an enlarged head region 27' of the boss 22 will be uppermost and abut the lever web 13.

Figure 6:
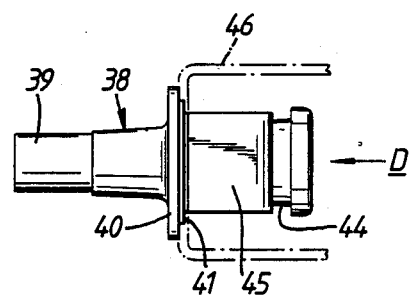
FIG. 6 is a scrap underplan view in the direction of arrow C of FIG. 2, showing the cable hub assembled to the anchor plate of the mechanism, but omitting the cable and gaiter.
Figure 7:
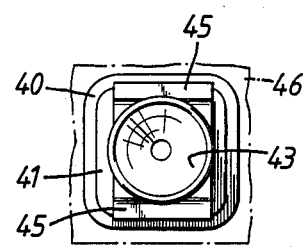
FIG. 7 is an end elevation in the direction of arrow D of FIG. 6.

Referring now particularly to FIGS. 2, 6 and 7, the cable casing 20 is secured to the anchor plate 10 by means of a cable hub 38 having a stem 39 embraced by a metal sleeve (not shown) and crimped thereat on to the casing. The front end of the stem 39 is integral with a generally square cross-section flange 40. A forward seating flange 41 of similar cross-section but of smaller dimensions is integral with the flange 40. Extending forwardly of the seating flange 41 is a tubular stem 42 having a central aperture 43 therein through which the cable core 19 passes. The aperture 43 is flared outwardly towards the front end of the cable hub 38. The outer periphery of the cable hub front end is fashioned with an annular recess 44 and rearwardly thereof the cable hub 38 is provided with a pair of opposed resiliently deformable arms or wings 45 which are generally square in plan view and which extend rearwardly and radially outwardly, terminating just short of the seating flange 41 and extending slightly radially outwardly thereof.

The anchor plate 10 has a rear wall 46 with a generally square cut-out 47 therein through which the cable core 19 is passed during its assembly to the lever 3. The dimensions of the cut-out 47 are complementary to those of the periphery of the seating flange 41 of the cable hub 38. The thickness of the anchor plate wall 46 is generally equal to the axial spacing between the cable hub flange 40 and the rearward termination of the wings 45. Therefore, when the cable hub 38 is pushed through the cut-out 47 in the anchor plate wall 46, the wings 45 will resiliently deform inwardly upon engaging the cut-out edges until the seating flange 41 of the cable hub is engaged in the cut-out when the wings will spring radially outwardly to snap against the inside face of the wall 46, which will be sandwiched between those wings and the cable hub flange 40, by which the cable hub is detachably secured to the anchor plate.

A gaiter or bellows seal 48 may be provided around the cable core 19, seating at one end in the annular recess 44 in the cable hub 38 and at its opposite end either around the core to abut the spigot 23 to the core lug 21 or around the spigot itself.

In this particular embodiment the cable 18 is a pull cable, i.e. is core 19 transmits load only in the tensile mode. As such, the reaction force on the casing 20 is in the compression mode. As best seen in FIG. 2, the tensile load on the core 19 is not taken by the nibs 29 of the resilient arms 28 of the retaining clip 26 but, rather, by the abutment of the enlarged head 27' of the clip boss 22 against the lever web 13 together with the abutment of the radial root areas of the arms with the lever web. Similarly, the reaction compression force on the cable hub 38 is not imparted to the resilient wings 45 of the hub but, instead, to the abutment of the hub flange 40 with the anchor plate wall 46. In other words, although the retaining clip 26 and cable hub 38 are attached to the lever 3 and anchor plate 10, respectively, by easily and quickly engageable resiliently deformable means, the operating forces are arranged to be taken by independent robust abutment surfaces and hence have no effect on the attachment structure.

As will now be realized, the cable 18 is provided complete, or integral with, the retaining clip 26 and cable hub 38 by which to attach its core 19 and hub 38 to a movable operator (or operated) member and reaction, stationary structure, respectively, so that there are no separate loose piece connector parts and, moreover, assembly is obtained merely by the application of manual forces requiring no special tools. In practice, the cable hub 38 could conveniently be push-fitted first into the receiving cut-out 47 in the anchor plate wall 46 and the retaining clip 26 then sprung on to the lever 3.

Preferably, the cable hub 38 is a one-piece moulding of a plastics material as also is the retaining clip 26.

The described and illustrated foot pedal controller 1 could be used in combination with a hand control (not shown) by which the cable 18 is operable either by foot pressure or by hand. In such an instance, the lug 21 is omitted and the cable core 19 is continued through the clip aperture 34 and extended to the station at which hand control is to be exerted and there secured to a hand operator such as a knob. Also, a second cable casing is provided through which that cable core extension passes, one end of that casing seating in the countersink 32 of the clip boss 27.

With this construction, when hand control is to be applied, the knob is operated to exert a pull force upon the cable core extension to translate the core within its casing and so operate a controlled member (not shown). It is to be noted that such operation of the cable will have no effect upon the lever 3 affixed to the pedal 1, the core simply translating through the clip 26 without exerting any force via the clip on the pedal lever.

When foot pressure is applied to the pedal 1, the second cable casing between the clip 26 and the hand control knob is subjected to a compression force and the reaction on the cable core extension is in the tension mode thereby causing the required translation of the cable core to operate the controlled member.

I claim:

1. A remote control mechanism, comprising:
   a stationary member;
   a movable member having an aperture and a communicating slot from one edge of the movable to that aperature;
   a cable having a core translatable within a cable casing;
   first resiliently deformable means for engaging the cable casing with respect to the stationary member; and
   second resiliently deformable means for interconnecting the cable core to the movable member,
   wherein the second resiliently deformable means comprises a retaining clip having a lug fitting in the communicating slot in the movable member and and aperture boss mounted in the aperture in the movable member with resiliently deformable arm means extending from the apertured boss for snap fitting the retaining clip to the movable member,
   wherein further the cable core enters transversely through the communicating slot into the aperture in the movable member and through the retaining clip, the retaining clip then is snap fit into the movable member to retain the cable core with the lug of the retaining clip fitted in the communicating slot to prevent transverse withdrawal of the cable core with respect to the aperture in the movable member.

2. A remote control mechanism as claimed in claim 1, wherein the first resiliently deformable means comprises a cable hub fast with the casing and snap fitted to the stationary member.

3. A remote control mechanism as claimed in claim 2, including an aperture in the stationary member into which the cable hub is mountable as a push fit, the cable hub having an abutment flange abutting a face of the stationary member on one side of the aperture and resiliently deformable arm means adapted to radially contract as the cable hub is mounted into the aperture and then spring radially outwards to lie adjacent a face of the stationary member on the opposite side of the aperture, by which the stationary member is sandwiched between the cable hub flange and arm means to secure the cable hub to the stationary member.

4. A remote control mechanism as claimed in claim 3, wherein the cable core is operated in a tensile mode thereby causing a reaction force on the cable casing in a compression mode which is taken by the abutment of the cable hub flange with the stationary member.

5. A remote control mechanism as claimed in claim 4, wherein the cable hub has a polygonal seating flange seating in the aperture in the stationary member which is of complementary configuration, the resiliently deformable arm means extending from a forward part of the cable hub rearwardly towards the stationary member and radially outwardly beyond the periphery of the seating flange.

6. A remote control mechanism as claimed in claim 5, wherein the resiliently deformable arm means comprise a pair of diametrically opposed arms which are of rectangular configuration in plan.

7. A remote control mechanism as claimed in claim 6, wherein the cable hub is a one-piece moulding.

8. A remote control mechanism as claimed in claim 1, wherein the movable member is of U-shaped cross-section with the aperture in the web thereof adjacent an end of the movable member, the communicating slot extending from that end to the aperture, and the resiliently deformable arm means comprising a pair of diametrically opposed arms engaging the opposite flanges of the U-shaped movable member.

9. A remote control mechanism as claimed in claim 8, wherein each of the arms has a nib at its end, and the arms are arranged to spring radially outwardly as the apertured boss is mounted in the aperture in the movable member and then snap inwardly to engage the nibs behind the associated flange end edge.

10. A remote control mechanism as claimed in claim 9, wherein each of the nibs has an angled end to assist the passage of the respective arm as it springs radially outwardly and further has a radial shoulder engaging behind the associated flange end edge.

11. A remote control mechanism as claimed in claim 8, wherein the apertured boss of the retaining clip is generally rectangular with rounded ends to locate in the aperture in the movable member which is of complementary configuration.

12. A remote control mechanism as claimed in claim 11, wherein the retaining clip has its apertured boss on one side of an enlarged head from which the arms extend, the enlarged head abutting the web of the U-shaped movable member to take loading imparted by the movable member when effecting a pull loading on the cable core.

13. A remote control mechanism as claimed in claim 12, including a countersunk boss on the other side of the enlarged head of the retaining clip.

14. A remote control mechanism as claimed in claim 13, wherein the cable core is secured to a lug having a head engaging in the countersunk boss by which operational movement of the movable member will translate the cable core in a pull mode.

15. A remote control mechanism as claimed in claim 13, wherein the retaining clip is a one-piece moulding.

16. A remote control mechanism as claimed in claim 1, wherein the movable member is a pivotable lever operated by a foot pedal.

17. A remote control mechanism as claimed in claim 16, including a tension spring interconnecting the stationary member and the pivotable lever and resisting motion of the lever effecting translation of the cable in a pull mode.

18. A remote control mechanism as claimed in claim claim 17, wherein the lever is pivotally mounted in a mounting flange to the underside of which is fastened an anchor plate constituting the stationary member.

19. A remote control mechanism as claimed in claim 18, wherein the lever extends through bearing member means rotatably mounted between bearing regions of the mounting flange and the anchor plate.

* * * * *